United States Patent Office 3,801,602
Patented Apr. 2, 1974

3,801,602
2-IMINO-6-AMINO-SUBSTITUTED COUMARINS
Horst Scheuermann, Ludwigshafen, Wolfgang Mach, Hockenheim, and Volker Radtke, Frankenthal, Germany, assignors to Badische Anilin- & Soda-Fabrik Aktiengesellschaft, Ludwigshafen (Rhine), Germany
No Drawing. Filed June 6, 1972, Ser. No. 260,323
Int. Cl. C07d 7/20
U.S. Cl. 260—345.2     3 Claims

ABSTRACT OF THE DISCLOSURE

Fluorescent dyes containing a 2-imino-6-amino-substituted coumarin moiety. The dyes are eminently suitable for use in textile printing colors and give brilliant yellow shades having good fastness properties.

The invention relates to dyes of the General Formula I:

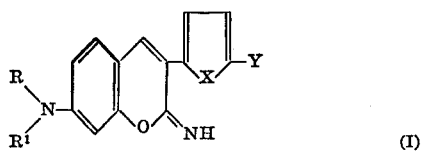

(I)

in which

R is hydrogen, alkyl of one to four carbon atoms, alkyl of one to four carbon atoms bearing alkoxy, chlorine, bromine, carboxyl carbalkoxy, carbamoyl or acetoxy as a substituent, cyclohexyl, benzyl or phenylethyl;
$R^1$ is hydrogen, alkyl of one to four carbon atoms or alkyl of one to four carbon atoms bearing alkoxy, chlorine, bromine, carboxyl, carbalkoxy, carbamoyl or acetoxy as a substituent;
R and $R^1$ together with the nitrogen denote the radical of a five-membered or six-membered heterocyclic ring;
X is a radical of the formula —O—, —S— or

—CH=CH—;

and
Y is hydrogen, chlorine, bromine, cyano, nitro, carbalkoxy of a total of two to nine carbon atoms, carbamoyl, sulfonamido, N-mono-substituted carbamoyl, N,N-disubstituted carbamoyl, N-monosubstituted sulfonamido or N,N-disubstituted sulfonamido.

The following are further examples of suitable substituents:
For R and $R^1$:

methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl and β-acetoxypropyl.

R and $R^1$ together with the nitrogen may be for example the radical of pyrrolidine, piperidine, morpholine, piperazine or N-methylpiperazine.
For Y:

carbomethoxy, carboethoxy, carbo-n-propoxy, carboisopropoxy, carbo-n-butoxy, carbisobutoxy, carbo-β-methoxyethoxy, carbo-β-ethoxyethoxy, carbo-β-butoxyethoxy, N-methylcarbamoyl, N-ethylcarbamoyl, N-butylcarbamoyl, N-β-hydroxyethylcarbamoyl, N,N-dimethylcarbamoyl, N,N-diethylcarbamoyl, N,N-dibutylcarbamoyl, N-methyl-N-β-hydroxyethylcarbamoyl, N-ethyl-N-β-hydroxyethylcarbamoyl, N,N-di-β-hydroxyethylcarbamoyl, carboxypiperidide, carboxypyrrolidide, carboxymorpholide, carboxypiperazide, carboxy-N-methylpiperazide, and the corresponding sulfonamido derivatives.

The new compounds are greenish yellow fluorescent substances which are suitable for dyeing synthetic fibers such as polyacrylonitrile, polyester, secondary cellulose acetate and triacetate fibers and particularly for the production of brilliant textile prints based on pigmented plastics and for the production of daylight fluorescent pigments.

Compounds of the Formula I may be prepared by reaction of a compound of the Formula II:

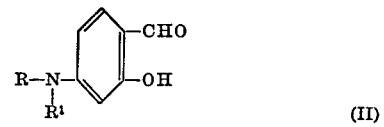

(II)

with a compound of the Formula III:

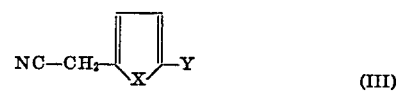

(III)

R, $R^1$, X and Y having the meanings given above. The reaction is conveniently carried out in a solvent in the presence of an inorganic or organic basic condensing agent, preferably an amine, at temperatures of from 0° to 150° C., preferably from 50° to 100 C.

Particularly suitable solvents are polar organic solvents, for example alcohols such as methanol, ethanol, glycols and glycol ethers such as ethylene glycol or ethylene glycol monomethyl ether, dioxane, tetrahydrofuran, dimethylformamide and N-methylpyrrolidone.

Examples of basic condensing agents are alkali metal carbonates such as sodium or potassium carbonate, alkali metal salts of lower fatty acids such as sodium or potassium acetate and particularly amines such as triethylamine, piperidine, pyrrolidine, dicyclohexylethylamine and pyridine.

Dyes of the Formula Ia:

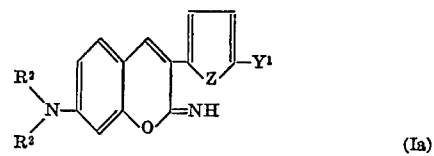

(Ia)

in which
$R^2$ is methyl or ethyl;
—Z— is a radical of the formula: —CH=CH— or —S—;
and
$Y^1$ is cyano or carbalkoxy of a total of two to nine carbon atoms are of particular industrial significance.

The following examples illustrate the invention. Unless stated otherwise, parts and percentages in the following examples are by weight.

EXAMPLE 1

11.6 parts of 4 - diethylaminosalicylaldehyde and 10 parts of 2-cyanomethylthiophene-5-carboxylic methyl esters are dissolved in 70 parts of alcohol, then 1 part of pyrrolidine is added to the solution and the whole is boiled for thirty minutes under reflux and allowed to cool to 0° to 5° C. The precipitate is then suction filtered, washed with 10 parts of methanol and dried. 5 g. of 3-(5'-carbomethoxythienyl-(2') - 7 - diethylamino-2-iminocoumarin is obtained in the form of yellow crystals which melt at 163° to 164° C.

EXAMPLE 2

The procedure described in Example 1 is followed but 9.8 parts of 4-dimethylaminosalicylaldehyde is used instead of 4-diethylaminosalicylaldehyde. 6.2 parts of 3-(5')-carbomethoxythienyl-(2') - 7 - dimethylamino-2-iminocoumarin is obtained as yellow crystals having a melting point of 204° to 205° C.

EXAMPLE 3

19.3 parts of 4-diethylaminosalicylaldehyde and 14.2 parts of p-cyanobenzyl cyanide are dissolved in 110 parts of alcohol, then 2 parts of pyrrolidine is added and the whole is boiled under reflux for two hours. It is then cooled to 0° to 5° C., suction filtered washed with 50 parts of alcohol and dried. 20 parts of 3-(p-cyanophenyl)-7-diethylamino-2-iminocoumarin is thus obtained in the form of yellow red crystals which melt at 145° to 146° C.

EXAMPLE 4

The 4-diethylaminosalicylaldehyde in Example 3 is replaced by 16.5 parts of 4-dimethylaminosalicylaldehyde. 18 parts of 3-(p-cyanophenyl)-7-dimethylamino-2-iminocoumarin is obtained as yellow crystals which melt at 179° to 180° C.

EXAMPLE 5

16.2 parts of p-nitrobenzyl cyanide, 19.3 parts of diethylaminosalicylaldehyde, 80 parts of alcohol and 2 parts of pyrrolidine are heated under reflux for twenty minutes, then cooled to 0° to 5° C. and suction filtered. 28 parts of 3-(p-nitrophenyl)-7-diethylamino-2-imino-coumarin is obtained in the form of red crystals which can be recrystallized from toluene or alcohol and then have a melting point of 170° to 171° C.

EXAMPLE 6

34.2 parts of o,p-toluenesulfonamide, 10.4 parts of melamine, 19.4 parts of paraformaldehyde and 1 part of the dye from Example 3 are mixed, melted at 120° to 130° C. while stirring and then hardened for ninety minutes at 160° C. After the whole has been cooled and ground about 55 parts of a brilliant yellow pigment is obtained. 23 parts of this pigment and 31.65 parts of a mixture of 15 parts of the sodium salt of pentachlorophenol, 750 parts of the adduct of about 23 moles of ethylene oxide to 1 mole of sperm oil alcohol, 800 parts of glycol N and 1500 parts of water are worked up into a paste by grinding in a three-roll mill. This paste is incorporated into a binder conventionally used for pigment printing and printed onto textile material. Very brilliant greenish yellow prints are obtained.

The following dyes are obtained in analogous manner:

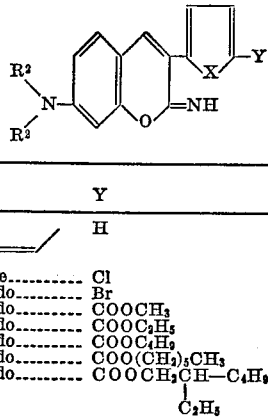

| Example | R² | X | Y | Shade on polyester |
|---|---|---|---|---|
| 7 | C₂H₅ | ⟨=⟩ | H | Greenish yellow. |
| 8 | C₂H₅ | Same | Cl | Do. |
| 9 | C₂H₅ | do | Br | Do. |
| 10 | C₂H₅ | do | COOCH₃ | Do. |
| 11 | C₂H₅ | do | COOC₂H₅ | Do. |
| 12 | C₂H₅ | do | COOC₄H₉ | Do. |
| 13 | C₂H₅ | do | COO(CH₂)₅CH₃ | Do. |
| 14 | C₂H₅ | do | COOCH₂CH—C₄H₉ <br>      \|<br>     C₂H₅ | Do. |
| 15 | C₂H₅ | do | CONH₂ | Do. |
| 16 | C₂H₅ | do | SO₂NH₂ | Do. |
| 17 | C₂H₅ | do | COOC₂H₄OCH₃ | Do. |
| 18 | C₂H₅ | do | COOC₂H₄OC₂H₅ | Do. |
| 19 | C₂H₅ | do | COOC₂H₄OC₄H₉ | Do. |
| 20 | C₂H₅ | do | CONHCH₃ | Do. |
| 21 | C₂H₅ | do | CON(CH₃)₂ | Do. |
| 22 | C₂H₅ | do | CONHC₂H₅ | Do. |
| 23 | C₂H₅ | do | CONHC₄H₉ | Do. |
| 24 | C₂H₅ | do | CONHC₂H₄OH | Do. |
| 25 | C₂H₅ | do | CON(C₂H₅)₂ | Do. |
| 26 | C₂H₅ | do | CON(C₄H₉)₂ | Do. |
| 27 | C₂H₅ | do | CON(CH₃)(C₂H₄OH) | Do. |
| 28 | C₂H₅ | do | CON(C₂H₄OH)₂ | Do. |
| 29 | C₂H₅ | do | CON-pyrrolidinyl | Do. |
| 30 | C₂H₅ | do | CON-piperidinyl | Do. |
| 31 | C₂H₅ | do | CON-morpholinyl | Do. |
| 32 | C₂H₅ | do | CON-piperazinyl (N—H) | Do. |
| 33 | C₂H₅ | do | CON-(N-methyl)piperazinyl (N—CH₃) | Do. |
| 34 | C₂H₅ | do | SO₂NHCH₃ | Do. |
| 35 | C₂H₅ | do | SO₂NHC₄H₉ | Do. |
| 36 | C₂H₅ | do | SO₂NHC₆H₅ | Do. |
| 37 | C₂H₅ | do | SO₂NHC₂H₄OH | Do. |
| 38 | C₂H₅ | do | SO₂N(CH₃)₂ | Do. |
| 39 | C₂H₅ | do | SO₂N(C₂H₅)₂ | Do. |
| 40 | C₂H₅ | do | SO₂N(C₄H₉)₂ | Do. |

TABLE—Continued

| Example | R² | X | Y | Shade on polyester |
|---|---|---|---|---|
| 41 | C₂H₅ | ...do... | SO₂N(CH₃)(C₂H₄OH) | Do. |
| 42 | C₂H₅ | ...do... | SO₂N(C₂H₄OH)₂ | Do. |
| 43 | C₂H₅ | ...do... | SO₂N(pyrrolidinyl) | Do. |
| 44 | C₂H₅ | ...do... | SO₂—N(piperidinyl) | Do. |
| 45 | C₂H₅ | ...do... | SO₂—N(morpholinyl) | Do. |
| 46 | C₂H₅ | ...do... | SO₂—N(piperazinyl-NH) | Do. |
| 47 | C₂H₅ | ...do... | SO₂—N(N-methylpiperazinyl) | Do. |
| 48 | C₂H₅ | S | CN | Reddish yellow. |
| 49 | C₂H₅ | S | COOC₂H₅ | Brilliant yellow. |
| 50 | C₂H₅ | S | COOC₄H₉ | Do. |
| 51 | C₂H₅ | S | COO(CH₂)₅CH₃ | Do. |
| 52 | C₂H₅ | S | COOCH₂CH(C₂H₅)—C₄H₉ | Do. |
| 53 | C₂H₅ | S | COOC₂H₄OCH₃ | Do. |
| 54 | C₂H₅ | S | COOC₂H₄OC₂H₅ | Do. |
| 55 | C₂H₅ | S | COOC₂H₄OC₄H₉ | Do. |
| 56 | C₂H₅ | S | CONH₂ | Do. |
| 57 | C₂H₅ | S | CONHCH₃ | Do. |
| 58 | C₂H₅ | S | CON(CH₃)₂ | Do. |
| 59 | C₂H₅ | S | CON(C₄H₉)₂ | Do. |
| 60 | C₂H₅ | S | CON(pyrrolidinyl) | Do. |
| 61 | C₂H₅ | S | CON(piperidinyl) | Do. |
| 62 | C₂H₅ | S | CON(morpholinyl) | Do. |
| 63 | C₂H₅ | S | CON(piperazinyl-NH) | Do. |
| 64 | C₂H₅ | S | CON(N-methylpiperazinyl) | Do. |
| 65 | C₂H₅ | O | CN | Do. |
| 66 | C₂H₅ | O | COOCH₃ | Do. |
| 67 | C₂H₅ | O | COOC₂H₅ | Do. |
| 68 | C₂H₅ | O | COOC₂H₄OCH₃ | Do. |
| 69 | C₂H₅ | O | CONH₂ | Do. |
| 70 | C₂H₅ | O | CONHCH₃ | Do. |
| 71 | C₂H₅ | O | CON(CH₃)₂ | Do. |
| 72 | C₂H₅ | O | CON(C₄H₉)₂ | Do. |
| 73 | C₂H₅ | O | CON(pyrrolidinyl) | Do. |
| 74 | C₂H₅ | O | CON(piperidinyl) | Do. |
| 75 | C₂H₅ | O | CON(morpholinyl) | Do. |
| 76 | C₂H₅ | O | CON(piperazinyl-NH) | Do. |
| 77 | C₂H₅ | O | CON(N-methylpiperazinyl) | Do. |

NOTE.—Corresponding compounds with R²=CH₃ have almost identical properties.

We claim:
1. A fluorescent dye of the formula

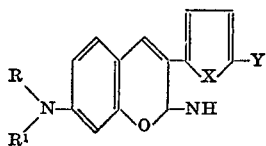

(I)

in which:

R is hydrogen; alkyl of one to four carbon atoms or said alkyl of one to four carbon atoms which bears methoxy, ethoxy, chlorine, bromine, carboxyl, carbomethoxy, carboethoxy, carbobutoxy, carbamoyl or acetoxy as a substituent; cyclohexyl; benzyl; or phenylethyl;

$R^1$ is hydrogen; alkyl of one to four carbon atoms or said alkyl of one to four carbon atoms which bears methoxy, ethoxy, chlorine, bromine, carboxyl, carbomethoxy, carboethoxy, carbobutoxy, carbamoyl or acetoxy the work;

R and $R^1$ together with the nitrogen denote pyrrolidino, piperidino, morpholino, piperazino or N-methylpiperazino;

X is a radical of the formula $$—O—, —S— \text{ or } —CH=CH—$$

and

Y is hydrogen, chlorine, bromine, cyano, nitro, carbalkoxy having a total of two to nine carbon atoms, carbamoyl, sulfamoyl, N-methylcarbamoyl, N-ethylcarbamoyl, N-butylcarbamoyl, N-β-hydroxyethylcarbamoyl, N,N-dimethylcarbamoyl, N,N-diethyl carbamoyl, N,N - dibutylcarbamoyl, N - methyl-N-β-hydroxyethylcarbamoyl, N-ethyl-N-β-hydroxyethylcarbamoyl, N,N-di - β - hydroxyethylcarbamoyl, carboxypiperidide, carboxypyrrolidide, carboxymorpholide, carboxypiperazide, carboxy-N-methylpiperazide, N-methylsulfamoyl, N-ethylsulfamoyl, N-butylsulfamoyl, N-β-hydroxyethylsulfamoyl, N,N-dimethylsulfamoyl, N,N-diethylsulfamoyl, N,N-dibutylsulfamoyl, N-methyl-N-β-hydroxyethylsulfamoyl, N-ethyl-N-β-hydroxyethylsulfamoyl, N, N-di-β-hydroxyethylsulfamoyl, sulfopiperidide, sulfopyrrolidide, sulfomorpholide, sulfopiperazide or sulfo-N-methylpiperazide.

2. A dye as claimed in claim 1 of the formula

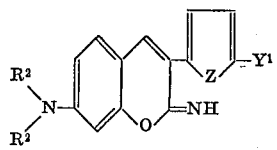

(Ia)

in which $R^2$ is methyl or ethyl, —Z— is the radical of the formula —CH=CH— or —S— and $Y^1$ is cyano or carbalkoxy of a total of two to nine carbon atoms.

3. The fluorescent dye of the formula

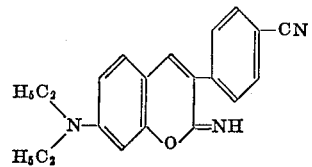

References Cited

UNITED STATES PATENTS 2,789,995  4/1957  Johnston _____ 260—465

U.S. Cl. X.R.

8—4, 177 R, 179; 252—301.2; 260—247.1, 247.2 B, 247.2 A, 247.2 R, 247.5 B, 268 BC, 293.58, 326.3, 326.5 SM, 332.2 C, 332.2 A, 332.3 P

UNITED STATES PATENT OFFICE
CERTIFICATE OF CORRECTION

Patent No. 3,801,602      Dated April 2, 1974

Inventor(s) Horst Scheuermann, Wolfgang Mach & Volker Radtke

It is certified that error appears in the above-identified patent and that said Letters Patent are hereby corrected as shown below:

Column 1, line 7, insert
-- [30]   Foreign Application Priority Data
          June 15, 1971   Germany . . . . . P 21 29 565.8 --.

Column 1, line 61, "carbisobutoxy" should read
-- carboisobutoxy --.

Column 5, example 51, column Y, "$COO(CH_2)_5CH_5$" should read
-- $COO(CH_2)_5CH_3$ --.

Signed and sealed this 22nd day of October 1974.

(SEAL)
Attest:

McCOY M. GIBSON JR.
Attesting Officer

C. MARSHALL DANN
Commissioner of Patents